(12) United States Patent
Schmid et al.

(10) Patent No.: US 9,897,498 B2
(45) Date of Patent: Feb. 20, 2018

(54) METHOD FOR DETECTING A TORQUE APPLIED TO A SHAFT

(71) Applicant: Continental Teves AG & Co. oHG, Frankfurt (DE)

(72) Inventors: Bernhard Schmid, Friedberg (DE); Wolfgang Jöckel, Gersfeld (DE); Klaus Rink, Rodenbach (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 162 days.

(21) Appl. No.: 14/653,533

(22) PCT Filed: Dec. 13, 2013

(86) PCT No.: PCT/EP2013/076587
§ 371 (c)(1),
(2) Date: Jun. 18, 2015

(87) PCT Pub. No.: WO2014/095652
PCT Pub. Date: Jun. 26, 2014

(65) Prior Publication Data
US 2015/0362388 A1    Dec. 17, 2015

(30) Foreign Application Priority Data

Dec. 21, 2012  (DE) .................. 10 2012 224 180
Dec. 21, 2012  (DE) .................. 10 2012 224 187

(51) Int. Cl.
*G01L 3/00*   (2006.01)
*G01L 3/10*   (2006.01)
(Continued)

(52) U.S. Cl.
CPC ............. *G01L 3/101* (2013.01); *B62D 6/10* (2013.01); *B62D 15/0215* (2013.01); *G01L 3/109* (2013.01)

(58) Field of Classification Search
CPC ........... G01L 3/101; G01L 3/109; B62D 6/10; B62D 15/0215
(Continued)

(56) References Cited

U.S. PATENT DOCUMENTS 3,589,178 A    6/1971   Germann
4,433,585 A    2/1984   Levine
(Continued)

FOREIGN PATENT DOCUMENTS

DE    1907368 A1    9/1969
DE    2815463 A1    11/1978
(Continued)

OTHER PUBLICATIONS

Chinese Office Action dated Jul. 5, 2016 for Chinese Application No. 201380073477.6, including translation, 12 pages.
(Continued)

*Primary Examiner* — Lisa Caputo
*Assistant Examiner* — Roger Hernandez-Prewitt
(74) *Attorney, Agent, or Firm* — RatnerPrestia

(57) ABSTRACT

A method for detecting a phase angle difference between a first periodic measurement signal and a second periodic measurement signal, wherein, for the purpose of determining a torque applied to a shaft, the two periodic measurement signals describe a rotation of the shaft at an axial distance from one another including superimposing a periodic auxiliary signal which simulates a previously known rotational speed for the shaft on the first periodic measurement signal in order to form a superimposition signal, and determining the phase angle difference on the basis of the superimposition signal and the second measurement signal.

10 Claims, 4 Drawing Sheets

(51) Int. Cl.
*B62D 6/10* (2006.01)
*B62D 15/02* (2006.01)

(58) Field of Classification Search
USPC ............... 73/862.08, 862.326, 862.333
See application file for complete search history.

(56) References Cited

U.S. PATENT DOCUMENTS

| | | | |
|---|---|---|---|
| 5,456,123 A * | 10/1995 | Parkinson | G01L 3/12 |
| | | | 73/1.09 |
| 5,775,090 A * | 7/1998 | Skarvan | F02C 9/28 |
| | | | 60/39.282 |
| 6,109,102 A | 8/2000 | Schneider | |
| 6,339,322 B1 | 1/2002 | Loreck et al. | |
| 6,456,090 B1 | 9/2002 | Ishikawa | |
| 7,292,325 B2 | 11/2007 | Lee | |
| 7,466,123 B2 | 12/2008 | Kato et al. | |
| 8,042,412 B2 | 10/2011 | Xia et al. | |
| 8,087,306 B2 | 1/2012 | Goll et al. | |
| 2002/0000129 A1 | 1/2002 | Madni et al. | |
| 2004/0050178 A1 * | 3/2004 | Parkinson | G01L 3/109 |
| | | | 73/862.328 |
| 2010/0088003 A1 * | 4/2010 | Meacham | F01D 21/003 |
| | | | 701/100 |

FOREIGN PATENT DOCUMENTS

| | | | |
|---|---|---|---|
| DE | 141202 A1 | 4/1980 | |
| DE | 19621902 A1 | 12/1997 | |
| DE | 19634715 A1 | 3/1998 | |
| DE | 10047949 A1 | 5/2001 | |
| DE | 102006030746 | 12/2007 | |
| DE | 102007059361 A1 | 9/2008 | |
| DE | 102009025989 A1 | 12/2009 | |
| EP | 2073375 A1 * | 6/2009 | H02P 23/04 |
| JP | 2010223601 A1 | 10/2010 | |

OTHER PUBLICATIONS

International Search Report for Internationa Application No. PCT/EP2013/076587, dated Apr. 8, 2014, 2 pages.

* cited by examiner

METHOD FOR DETECTING A TORQUE APPLIED TO A SHAFT

CROSS REFERENCE TO RELATED APPLICATION

This application is the U.S. National Phase Application of PCT International Application No. PCT/EP2013/076587, filed Dec. 13, 2013, which claims priority to German Patent Application No. 10 2012 224 180.9, filed Dec. 21, 2012 and German Patent Application No. 10 2012 224 187.6, filed Dec. 21, 2012, the contents of such applications being incorporated by reference herein.

FIELD OF THE INVENTION

The invention relates to a method for detecting a torque applied to a shaft and a control apparatus for performing the method and a torque sensor having the control apparatus.

BACKGROUND OF THE INVENTION

DE 10 2007 059 361 A1, incorporated by reference herein, discloses a torque sensor that takes a phase of two rotating encoder wheels on a shaft that are at an axial interval from one another as a basis for determining a torque applied to this shaft.

SUMMARY OF THE INVENTION

It is an aim of an aspect of the invention to improve the known torque sensor.

According to one aspect of the invention, a method for detecting a phase difference between a first periodic measurement signal and a second periodic measurement signal, wherein the two periodic measurement signals determine a torque applied to a shaft by describing a rotation by the shaft at an axial interval from one another, comprises the steps of:
  overlaying of the first periodic measurement signal with a periodic auxiliary signal, which simulates a previously known speed for the shaft, to form an overlay signal, and
  determination of the phase difference on the basis of the overlay signal and the second measurement signal.

The specified method is based on the consideration that the periodic measurement signals, particularly in the case of a torque sensor of the type cited at the outset in the stationary shaft, are present only when the shaft rotates. In many applications, for example in the case of a steering rod, it would, however, be desirable to detect a torque acting on the shaft even when the shaft is not rotating, that is to say stationary. This is the starting point for the specified method with the proposal that the rotation of the shaft be simulated and at least one of the two periodic measurement signals be overlaid with a periodic auxiliary signal that simulates the rotation. In this way, it is possible for the phase of the shaft to be detected over the axial interval of the shaft even when stationary, or even when the shaft is rotating very slowly, and to be evaluated for the torque acting on the shaft.

In one development, the specified method comprises the step of overlaying of the second periodic measurement signal with a further periodic auxiliary signal, which simulates a further previously known speed for the shaft, to form a further overlay signal. This simulates the rotation at both points of the shaft over the axial interval.

In a special development of the specified method, the periodic auxiliary signal and the further periodic auxiliary signal are the same, which means that the previously known speed and the further previously known speed are the same. In this way, the phase difference between the overlay signal and the further overlay signal corresponds directly to the phase difference between the first measurement signal and the second measurement signal.

In another development, the first periodic measurement signal is overlaid with the periodic overlay signal if a real speed of the shaft is below a predetermined value. In this case, the predetermined value can be chosen arbitrarily. By way of example, it can be chosen such that the specified method is carried out only when the shaft is stationary or close to stationary.

In yet another development, the first and second periodic measurement signals are produced in corresponding fashion on the basis of a first and a second magnetic rotating field, which are each output by the shaft in torque-resistant fashion with respect thereto.

In this case, the auxiliary signal can be produced arbitrarily. By way of example, the auxiliary signal can be directly output by an auxiliary signal source and overlaid with the first measurement signal. The same applies to the second measurement signal and the further auxiliary signal. In one development of the specified method, however, overlaying the first periodic measurement signal with the periodic auxiliary signal can also involve the first magnetic rotating field being overlaid with a periodic auxiliary magnetic field that produces the periodic auxiliary signal.

In an additional development of the specified method, a real speed of the shaft and the previously known speed of the shaft are opposite. This ensures that by increasing the real speed the real movement and the simulated movement of the shaft do not cancel one another out and hence a standstill is simulated for a very large movement by the shaft.

According to a further aspect of the invention, an apparatus is set up to perform one of the specified methods.

In one development of the specified apparatus, the specified apparatus has a memory and a processor. In this case, one of the specified methods is stored in the memory in the form of a computer program, and the processor is provided for the purpose of carrying out the method when the computer program is loaded into the processor from the memory.

According to a further aspect of the invention, a computer program comprises program code means in order to perform all the steps of one of the specified methods when the computer program is executed on a computer or one of the specified apparatuses.

According to a further aspect of the invention, a computer program product contains a program code that is stored on a computer-readable storage medium and that, when executed on a data processing device, performs one of the specified methods.

According to a further aspect of the invention, a torque sensor for detecting a torque, which is applied to a shaft, on the basis of a phase difference between a first periodic measurement signal and a second periodic measurement signal comprises one of the specified apparatuses for producing the two periodic measurement signals and an evaluation device for determining the torque on the basis of the phase difference between the two measurement signals.

The specified torque sensor can be used in any desired application, for example in a vehicle, in order to detect a torque on a torsion shaft, such as a steering shaft.

According to a further aspect of the invention, a vehicle comprises a specified torque sensor.

BRIEF DESCRIPTION OF THE DRAWINGS

The properties, features and advantages of this invention that are described above and also the way in which they are achieved will become clearer and more distinctly comprehensible in connection with the description of the exemplary embodiments that follows, said exemplary embodiments being explained in more detail in connection with the drawings, in which.

DETAILED DESCRIPTION OF THE PREFERRED EMBODIMENTS

In the figures, technical elements that are the same are provided with the same reference symbols and described only once.

Figure 1:
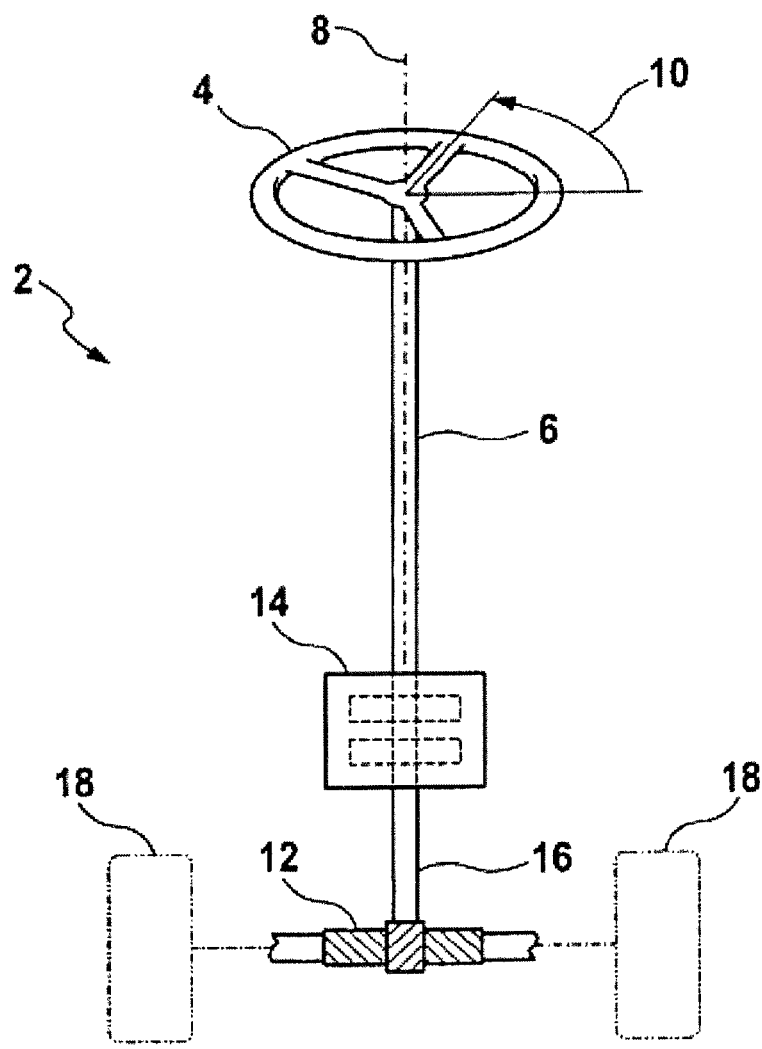
FIG. 1 shows a schematic view of a steering system for a vehicle.

Reference is made to FIG. 1, which shows a steering system 2 for a vehicle—which is not shown further.

The steering system 2 comprises a steering wheel 4 that is fitted to a shaft 6 that is in turn arranged so as to be rotatable about a rotation axis 8. The steering wheel 4 is therefore set up to take an angle position 10 around the rotation axis 8 as a basis for prescribing a steering angle for adjusting a steering gear 12 of the vehicle, which is not shown further. To this end, the steering wheel 4 is rotated by a driver, for example, of the vehicle that is not shown further.

In the present embodiment, the angle position 10 of the steering wheel 4 is detected by a drive apparatus 14, which then uses a motor—not shown further—in the drive apparatus 14 to drive a steering shaft 16 in order to operate the steering gear 12 such that wheels 18 of the vehicle that is not shown further are turned, in a manner that is known to a person skilled in the art, on the basis of the steering angle represented by the angle position 10.

In order to be able to turn the wheels 18 via the drive apparatus 14 on the basis of the angle position 10 of the steering wheel 4, it is necessary for the angle position 10 to be detected. This can be accomplished by using the steering angle sensors 20 shown in FIGS. 2 and 3, for example.

Figure 2:
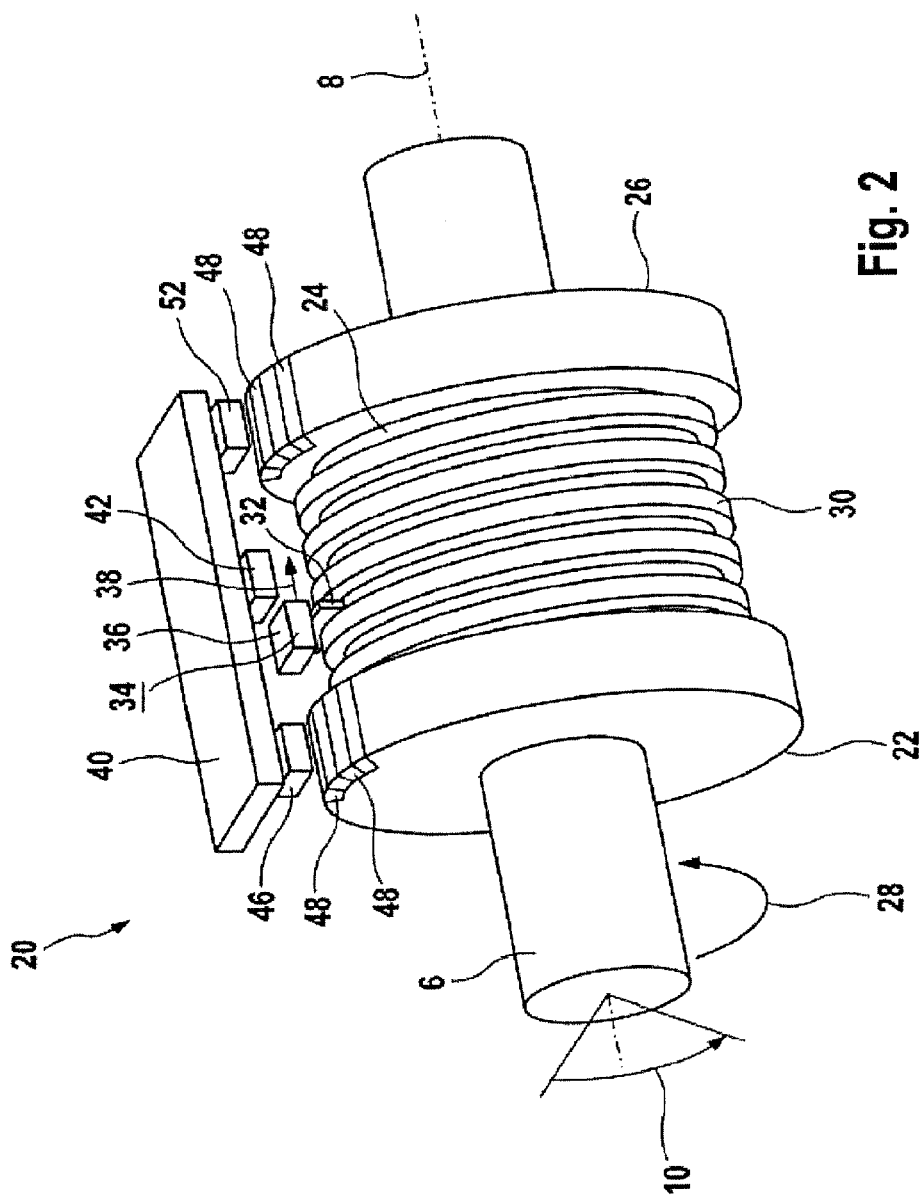
FIG. 2 shows a schematic view of a torque sensor in the vehicle of FIG. 1.

Reference is made to FIG. 2, which shows a steering angle sensor 20 for the steering system 2 from FIG. 1.

The steering angle sensor 20 has a first encoder wheel 22, a thread, in the form of a worm 24, that is axially and concentrically connected to the first encoder wheel 22, and a second encoder wheel 26 that is axially and concentrically connected to the worm 24 and that is axially opposite the first encoder wheel 22 at the worm 24.

In the present embodiment, the worm 24 is formed from an elastic material and can be twisted elastically by applying two opposite torques to the encoder wheels 22, 26. The shaft 6 is broken axially into two portions at the location of the steering angle sensor 20, the first encoder wheel 22 being arranged on the first portion of the broken shaft 6 and the second encoder wheel 26 being arranged on the second portion of the broken shaft 6. Therefore, if the shaft 6 is rotated with the steering wheel 4, the steering angle sensor 20 is firstly transferred to the angle position 10. At the same time, the steering angle sensor 20 is twisted with a torque 28 upon transfer to the angle position 10.

Within the context of the present embodiment, the angle position 10 and the torque 28 are intended to be able to be detected by measurement.

In order to detect the angle position, the worm 24 has turns 30 into which a small plate 32 of a transmitter element 34 engages, which has a transmitter magnet 36 fitted to it radially as seen from the rotation axis 8 of the shaft 6. When the shaft 6 is transferred to the angle position 10 by rotating the steering wheel 4 in the manner shown in FIG. 1, the transmitter element 34 is moved axially in relation to the shaft 6 by the worm 24 rotating with the shaft 6 and is put into an axial position 38 that is dependent on the angle position 10. In this case, the transmitter element 34 may be guided axially in relation to the shaft 6 in a manner that is not shown further.

That is to say that if the axial position 38 of the transmitter element 34 is known, then the angle position 10 of the shaft 6 and hence of the steering wheel 4 is also known.

In order to detect the axial position 38, an evaluation circuit 40 having a first magnetoresistive measurement pickup 42, such as a Hall sensor, an anisotropic magnetoresistive sensor or a gigamagnetoresistive sensor, is provided in the present embodiment, with the first magnetoresistive measurement pickup 42 outputting—in a manner that is known to a person skilled in the art—an absolute signal that is linearly dependent on the axial position 38 of the transmitter magnet 36 of the transmitter element 34. To this end, the evaluation circuit 40 having the first magnetoresistive measurement pickup 42 is arranged for the rotation of the shaft 6 and the axial movement of the transmitter element 30. Details relating to the production of a signal that is linearly dependent on the position of a transmitter magnet using a magnetoresistive measurement pickup can be found in DE 10 2006 030 746 A1, incorporated by reference herein for example, and are therefore not explained in more detail below for the sake of brevity.

The first encoder wheel 22 has magnets 48 arranged at the periphery, the poles of said magnets extending in the peripheral direction of the first encoder wheel 22. In this way, the first encoder wheel 22 emits, via the magnets 48, a radially extending magnetic field that is location dependent in the peripheral direction of the first encoder wheel 22. Arranged radially above the first encoder wheel 22 is the second magnetoresistive measurement pickup 46, which detects the radially extending magnetic field from the first encoder wheel 22 and thus outputs a first angle signal 50, shown in FIG. 3, that indicates the angle of the first encoder wheel 22. The angle signal 50 is produced in a similar manner to the absolute signal 44 and, if required, said production can be looked up in the document DE 10 2006 030 746 A1, incorporated by reference herein.

Like the first encoder wheel 22, the second encoder wheel 26 has magnets 48 arranged at the periphery, the poles of said magnets extending in the peripheral direction of the second encoder wheel 26. In this way, the second encoder wheel 26 also emits, via the magnets 48, a radially extending magnetic field that is location dependent in the peripheral direction of the second encoder wheel 26. Arranged radially above the second encoder wheel 26 is a third magnetoresistive measurement pickup 52, which detects the radially extending magnetic field from the second encoder wheel 26 and thus outputs a second angle signal 54 that indicates the angle of the second encoder wheel 26. The second angle signal 54 is produced in a similar manner to the first angle signal 50 and to the absolute signal and, if need be, said production can likewise be looked up in the document DE 10 2006 030 746 A1.

The determination of the torque 28 will be explained in more detail below with reference to FIG. 3, which shows a circuit diagram of a portion 56 of the evaluation circuit 40 of FIG. 2.

In this regard, the worm 24 is of torsional design in the present embodiment. That is to say that by applying the torque 28 it is possible for the worm 24 to be twisted in the direction of the torque 28, which produces a phase difference between the first encoder wheel 22 and the second encoder wheel 26, which is to say that the first encoder wheel 22 has an angle position 10 that is different than the angle position 10 of the second encoder wheel 26. This is exploited in order to measure the torque 28, since the torque 28 is dependent in a predetermined manner on this phase difference and hence on the difference between the angle positions 10.

Figure 3:
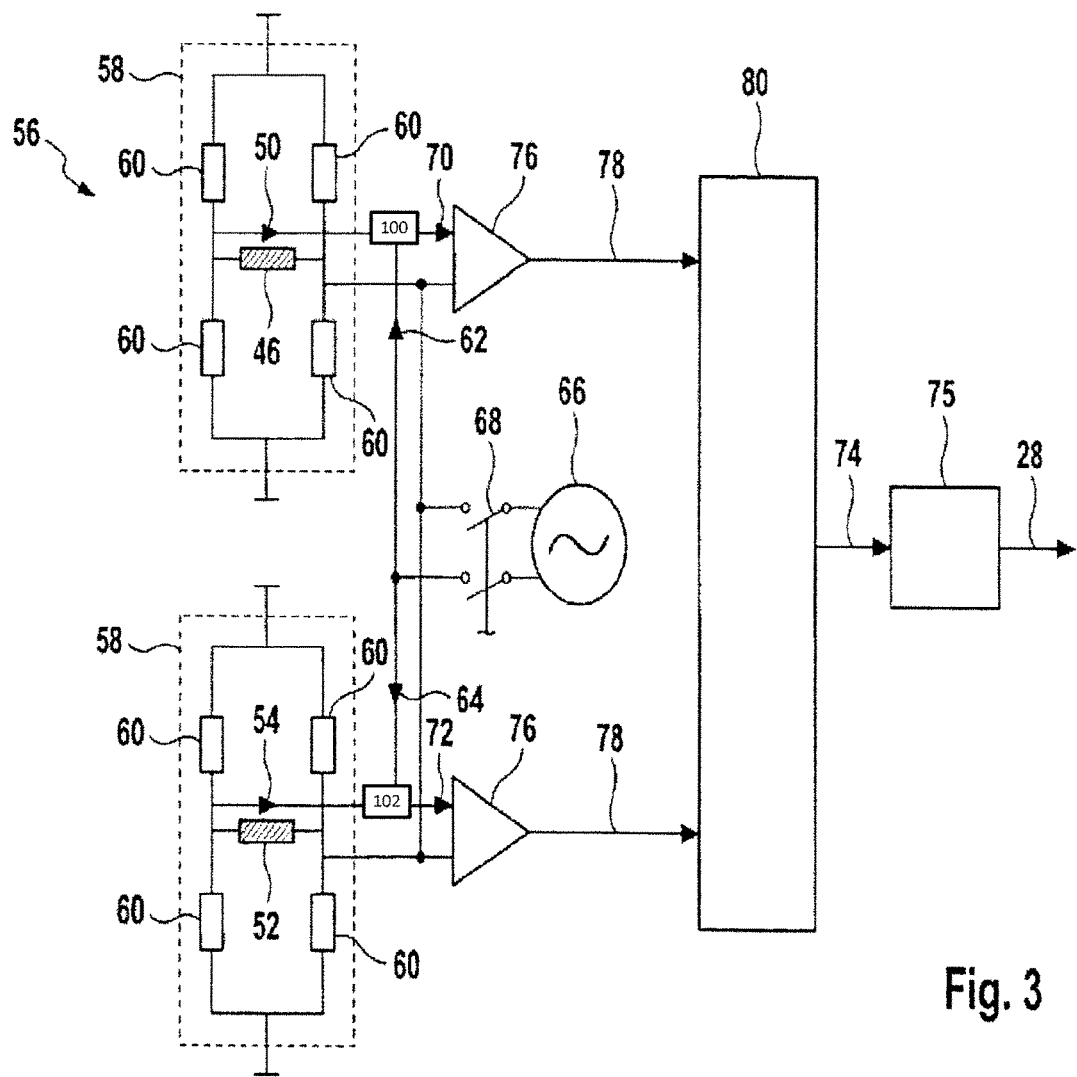
FIG. 3 shows a schematic view of an evaluation circuit for the torque sensor of FIG. 2.

In order to determine the phase difference, that portion 56 of the evaluation circuit 40 that is shown in FIG. 3 is therefore initially used to evaluate the angle signals 50, 54 and to determine the angles 10 of the encoder wheels 22, 26.

As already explained the angle signals 50, 54 are produced by means of the magnetoresistive measurement pickups 46, 52, which change their electrical resistance in a manner that is known per se by virtue of the movement of the encoder wheels 22, 26. In the present embodiment, this electrical resistance change is evaluated using measurement bridges 58, which are constructed from electrical resistors 60 in a manner that is known per se.

Since the movement of the encoder wheels 22, 26 is rotation, the electrical resistance of the magnetoresistive measurement pickups 46, 52 changes periodically by virtue of the angle position 10 of the encoder wheels 22, 26, which means that the angle signals 50, 54 produced by the resistance change are also periodic measurement signals. A phase difference between these periodic angle signals 50, 54 is directly the sought phase difference dependent on the torque 28.

However, the phase difference can be measured only if the periodic angle signals 50, 54 have sufficiently great amplitude. These periodic angle signals 50, 54 in turn have sufficiently great amplitude only when the encoder wheels 22, 26 are rotating. In other words, if an applied torque 28 means that the encoder wheels 22, 26 are static in relation to one another with a particular difference in their angle 10, it is not possible for the torque 28 to be detected solely on the basis of the angle signals 50, 54, since the latter do not have sufficiently great amplitude to evaluate the phase difference.

In order to overcome this problem, the present embodiment involves the angle signals 50, 54 being overlaid (e.g., phase modulated) via phase modulators 100 and 102 with, accordingly, a first periodic auxiliary signal 62 and a second periodic auxiliary signal 64. In the present embodiment, the two periodic auxiliary signals 62, 64 are output from a common auxiliary signal source 66 and can be controlled, for example by means of a switch 68, such that the output occurs only below a particular speed of rotation of the shaft 6, for example.

The overlaying (e.g., phase modulating) of the angle signals 50, 54 and the auxiliary signals 62, 64 via phase modulators 100 and 102 accordingly results in a first periodic overlay signal 70 and a second overlay signal 72, which are then accordingly applied to comparators 76. In the context of the present embodiment, the auxiliary signals 62, 64 are at a frequency that simulates a speed at which the shaft 6 is rotated virtually. As a result of the different angles 10 of the encoder wheels 22, 26, the auxiliary signals 62, 64 are phase-modulated, on the basis of the angle signals 50, 54, such that the overlay signals 70, 72 contain a phase difference 74 from which it is possible to infer the torque 28 applied to the shaft. Therefore, within the context of the present embodiment, it is merely necessary to determine this phase difference 74 and to determine the sought torque 28 therefrom, for example on the basis of a previously determined characteristic curve 75.

Although the phase difference 74 could be determined directly from the two overlay signals 70, 72, the present embodiment involves the overlay signals 70, 72 being converted, in comparators 76, into periodic square-wave signals 78 that greatly simplify the ascertainment of the phase difference 74 in an appropriate ascertainment device 80.

Figure 4:
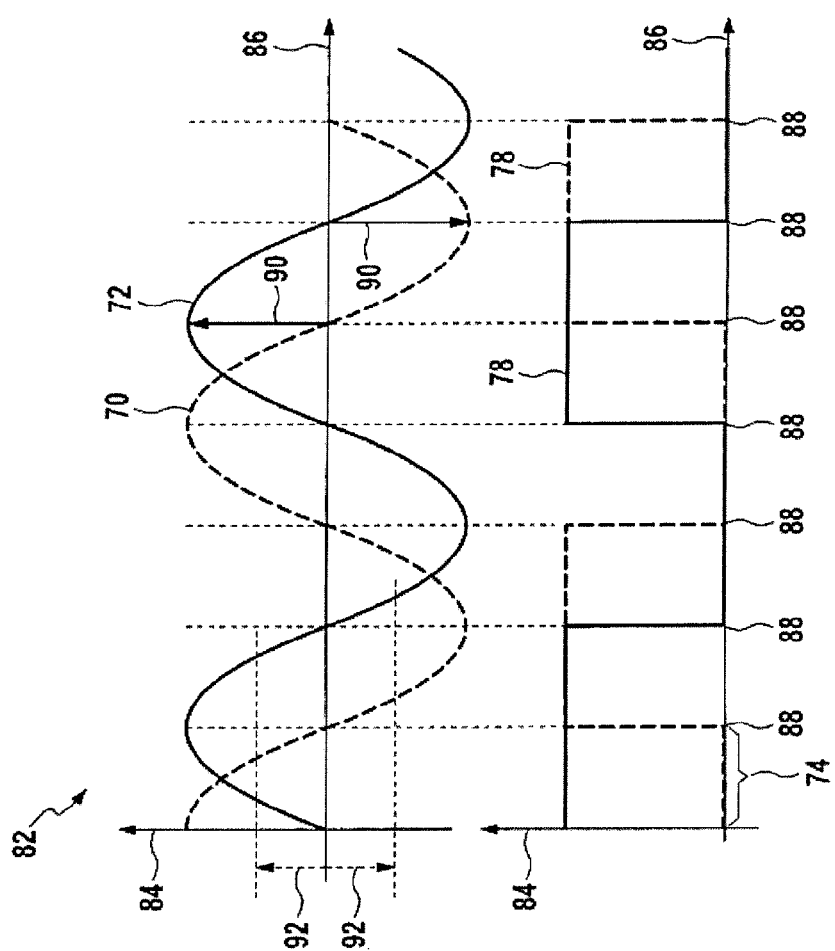
FIG. 4 shows a timing diagram with the measurement signals in the evaluation circuit of FIG. 3.

Reference is made to FIG. 4, which shows a timing diagram 82 with the overlay signals 70, 72 and the associated square-wave signals 78 in the portion 56 of the evaluation circuit 40 of FIG. 3. The signal values plotted in the diagram over time 86 are voltage values 84.

As can be seen in FIG. 4, the square-wave signals 78 are generated on the basis of switching points 88 at which the overlay signals 70, 72 change their arithmetic sign. So that these switching points 88 are not produced erroneously and lead to an incorrect phase difference 74, the amplitude 90 of the overlay signals 70, 72 needs to be sufficiently high.

To this end, the auxiliary signals 62, 64 are present, which enter a signal offset 92 into the overlay signals 70, 72 in order to stimulate the comparators 76 such that the aforementioned switching points 88 are generated in accordance with the angle position of the two encoder wheels 22, 26.

The invention claimed is:

1. A method for detecting a phase difference between a first periodic measurement signal and a second periodic measurement signal, wherein the two periodic measurement signals determine a torque applied to a shaft by describing a rotation by the shaft at an axial interval from one another, comprising:
   measuring, by an evaluation circuit, a first voltage produced by a sensor in response to detecting a position of a first encoder attached to the shaft;
   determining, by the evaluation circuit, the first periodic measurement signal based on the measured first voltage;
   phase modulating, by the evaluation circuit, the first periodic measurement signal with a first periodic auxiliary signal, the first periodic auxiliary signal generated by an auxiliary signal source to simulate a first previously known speed for the shaft, to form a first overlay signal; and
   determining, by the evaluation circuit, the phase difference between a first periodic measurement signal and a second periodic measurement signal by comparing respective phases of the first overlay signal and the second periodic measurement signal.

2. The method as claimed in claim 1, comprising phase modulating of the second periodic measurement signal with a second periodic auxiliary signal, which simulates a second previously known speed for the shaft, to form a second overlay signal.

3. The method as claimed in claim 2, wherein the first periodic auxiliary signal and the second periodic auxiliary signal are the same, which means that the first previously known speed and the second previously known speed are the same.

4. The method as claimed in claim 1, wherein the first periodic measurement signal is phase modulated with the first periodic overlay signal if a real speed of the shaft is below a predetermined value.

5. The method as claimed in claim 1, wherein the first and second periodic measurement signals are produced on the basis of a first and a second magnetic rotating field, which are each output by the shaft.

6. The method as claimed in claim 5, wherein phase modulating the first periodic measurement signal with the first periodic auxiliary signal involves the first magnetic rotating field being overlaid with a periodic auxiliary magnetic field that produces the first periodic auxiliary signal.

7. The method as claimed in claim 1, wherein the first periodic measurement signal is directly overlaid with the first periodic auxiliary signal.

8. The method as claimed in claim 1, wherein a real speed of the shaft and the first previously known speed of the shaft are in opposite rotational directions.

9. An apparatus that is set up to carry out a method for detecting a phase difference between a first periodic measurement signal and a second periodic measurement signal, wherein the two periodic measurement signals determine a torque applied to a shaft by describing a rotation by the shaft at an axial interval from one another, the apparatus comprising:

an evaluation circuit configured to:
measure a first voltage produced by a sensor in response to detecting a position of a first encoder attached to the shaft, and
determine the first periodic measurement signal based on the measured first voltage;
phase modulate the first periodic measurement signal with a first periodic auxiliary signal, which simulates a first previously known speed for the shaft, to form a first overlay signal; and
determine the phase difference on the basis of the first overlay signal and the second periodic measurement signal.

10. A torque sensor for detecting a torque, which is applied to a shaft, on the basis of a phase difference between a first periodic measurement signal and a second periodic measurement signal, comprising an apparatus as claimed in claim 9 for producing the two periodic measurement signals and an evaluation device for determining the torque on the basis of the phase difference between the two measurement signals.

* * * * *